US011154009B2

(12) United States Patent
Horning et al.

(10) Patent No.: US 11,154,009 B2
(45) Date of Patent: Oct. 26, 2021

(54) SINGLE DISK ROTARY FORAGE HARVESTER HEADER

(71) Applicant: Horning Manufacturing, LLC, East Earl, PA (US)

(72) Inventors: Leon Z. Horning, East Earl, PA (US); Leon H. Horning, Jr., Ephrata, PA (US)

(73) Assignee: Horning Manufacturing, LLC, East Earl, PA (US)

( * ) Notice: Subject to any disclaimer, the term of this patent is extended or adjusted under 35 U.S.C. 154(b) by 45 days.

(21) Appl. No.: 16/389,153

(22) Filed: Apr. 19, 2019

(65) Prior Publication Data

US 2019/0335664 A1    Nov. 7, 2019

Related U.S. Application Data

(60) Provisional application No. 62/666,237, filed on May 3, 2018.

(51) Int. Cl.
*A01D 45/02* (2006.01)
*A01D 43/08* (2006.01)
(Continued)

(52) U.S. Cl.
CPC ........... *A01D 45/021* (2013.01); *A01D 43/08* (2013.01); *A01D 43/082* (2013.01); *A01D 47/00* (2013.01);
(Continued)

(58) Field of Classification Search
CPC .... A01D 45/021; A01D 45/02; A01D 43/082; A01D 45/00; A01D 45/10; A01D 69/06;
(Continued)

(56) References Cited

U.S. PATENT DOCUMENTS 539,091 A * 5/1895 Smith .................... A01D 45/10
                                                          56/96
851,785 A * 4/1907 Tilson .................... A01D 45/10
                                                          56/96
(Continued)

FOREIGN PATENT DOCUMENTS

DE          3308077 A1 *  9/1984  ........... A01D 43/082
DE   102007038274 B3 *  4/2009  ........... A01D 43/082

*Primary Examiner* — Alicia Torres
*Assistant Examiner* — Madeline Ivy Runco
(74) *Attorney, Agent, or Firm* — Miller Law Group, PLLC

(57) ABSTRACT

A non-row sensitive forage harvester header is formed with a single rotary member driven by a simplified drive mechanism coupled to the primary drive of the forage harvester to which the header is mounted. A horizontal drive shaft transfers the rotational power laterally to a gear box. The vertical output shaft from the gearbox has a first drive sprocket mounted thereon to connect directly with a drive chain fixed to the crop transfer disks, and a second drive sprocket mounted thereon and coupled to a drive chain entrained around a driven sprocket on the cutting disk to provide a drive speed differential with respect to the crop transfer disks. The crop guides are formed with rearwardly angled transfer arms cooperable with sweeper members on the crop transfer disk to direct the severed crop into engagement with the transfer disks for feeding into the forage harvester.

16 Claims, 8 Drawing Sheets

(51) Int. Cl.
  *A01D 47/00* (2006.01)
  *A01D 69/06* (2006.01)
  *A01D 45/00* (2018.01)
  *A01D 45/10* (2006.01)

(52) U.S. Cl.
  CPC .............. *A01D 69/06* (2013.01); *A01D 45/00* (2013.01); *A01D 45/10* (2013.01)

(58) Field of Classification Search
  CPC ........ A01D 47/00; A01D 43/08; A01D 34/64; A01D 34/667; A01D 34/668; A01D 23/00–06
  See application file for complete search history.

(56) References Cited

U.S. PATENT DOCUMENTS

| | | | | |
|---|---|---|---|---|
| 2,067,104 | A * | 1/1937 | Spell | A01D 34/8355 171/24 |
| 3,398,515 | A * | 8/1968 | Ash | A01D 47/00 56/63 |
| 3,436,901 | A * | 4/1969 | Gehman | A01D 45/16 56/13.6 |
| 3,769,783 | A * | 11/1973 | Meharry | A01D 47/00 56/63 |
| 4,270,337 | A * | 6/1981 | Pinto | A01D 45/10 56/13.9 |
| 4,594,842 | A * | 6/1986 | Wolters | A01D 43/082 56/119 |
| 5,138,819 | A * | 8/1992 | Andre | A01D 45/10 56/10.2 R |
| 5,237,804 | A | 8/1993 | Bertling et al. | |
| 5,546,737 | A * | 8/1996 | Moosbrucker | A01D 43/082 56/94 |
| 5,651,243 | A | 7/1997 | Arnold et al. | |
| 5,722,725 | A | 3/1998 | Wuebbels et al. | |
| 6,032,444 | A * | 3/2000 | Herron | A01D 43/082 56/102 |
| 6,119,443 | A * | 9/2000 | Rauch | A01D 45/021 56/64 |
| 6,430,907 | B2 * | 8/2002 | Wolters | A01D 43/082 56/60 |
| 7,024,846 | B2 | 4/2006 | Bruening | |
| 7,121,070 | B2 * | 10/2006 | Krone | A01D 43/082 56/62 |
| 8,468,790 | B2 * | 6/2013 | Grobmeier | A01D 43/082 56/500 |
| 8,973,343 | B2 * | 3/2015 | Bell | A01D 34/66 56/13.7 |
| 9,775,292 | B2 * | 10/2017 | Horning | A01D 43/082 |
| 2001/0003238 | A1 * | 6/2001 | Wolters | A01D 43/082 56/119 |
| 2002/0148211 | A1 * | 10/2002 | Templeton | A01D 34/84 56/17.1 |
| 2004/0074217 | A1 * | 4/2004 | Reaux | A01D 45/00 56/51 |
| 2009/0054184 | A1 * | 2/2009 | Sakai | A01D 34/6806 474/111 |
| 2011/0173941 | A1 * | 7/2011 | Persson | A01D 34/74 56/17.1 |
| 2016/0207368 | A1 * | 7/2016 | Gaonjur | B64C 37/00 |
| 2017/0318740 | A1 * | 11/2017 | Heathcote | A01D 45/021 |

* cited by examiner

SINGLE DISK ROTARY FORAGE HARVESTER HEADER

CROSS-REFERENCE TO RELATED APPLICATIONS

This application claims domestic priority from U.S. Provisional Patent Application Ser. No. 62/666,237, filed on May 3, 2018, the content of which is hereby incorporated by reference.

FIELD OF THE INVENTION

The present invention relates generally to forage harvesters for harvesting and chopping stalky crop, and more particularly to a two-row sized forage harvester header that is operable to cut row crops, such as corn, without regard to the orientation of the forage harvester header relative to the rows of crop being harvested.

BACKGROUND OF THE INVENTION

Conventional forage harvester headers for cutting and chopping row crops such as corn are constructed with row units that require at least general alignment with the rows of crop being harvested. The forage harvester row units sever the standing row crop from the ground and convey the severed crop rearwardly to be chopped into small pieces by the rotating cutterhead. Row crops are planted in rows that are spaced a predetermined uniform distance from one another; however, this predetermined row spacing can be different from crop to crop and from one farmer to another. Accordingly, it has been desirable to provide a crop harvesting header that is operable to sever row crops irrespective of the row spacing, or even the direction of the rows relative to the forage harvester header as the machine is moved across a field. Moreover, current farming practices have some crops that have traditionally been planted as row crops being planted in a non-row seeding patterns. Such non-row crops can be harvested by a forage harvesting header that is non-row sensitive.

To meet this need for a non-row sensitive forage harvester header, headers have been constructed with at least two rotatable cutting members at the forward, crop-engaging portion of the forage harvester header. These rotatable cutting members are driven to sever the crop across substantially the entire working width as the header as the machine is moved across the field. The entire crop located in front of the header, irrespective of row spacing, or even the existence of row placement, is severed by the rotating cutting members. The cutting members capture the severed crop material and convey the severed crop material rearwardly with the rotation of the cutting members to rotating transfer members that receive the severed crop material from the cutting members and transfer the severed crop to the cutterhead for further harvesting treatment. These transfer members are often formed as a drum-shaped body having a plurality of circumferentially spaced fingers arranged in vertically spaced rows along the periphery of the drum surface. Alternatively, the transfer members may comprise a plurality of vertically spaced coaxial disks provided with a plurality of peripheral recesses for receiving the stalks.

These conventional transfer members have encountered difficulty in delivering the severed stalks to the cutterhead. This problem can be attributed to the path defined between the transfer member and the cutterhead for the movement of the row crop, as the row crop is not controlled in movement into the cutterhead. After conventional transfer members disengage the severed row crop in front of the cutterhead the row crop needs to be conveyed into the cutterhead for a distance without engagement of the transfer members to cause the flow of the crop material to enter the cutterhead in an orientation with the severed end being fed into the cutterhead first. For this reason, the flow of crop material into the cutterhead can become clogged. These problems are more evident in high capacity forage harvesters that utilize two or more transfer members rearwardly of the cutting members.

These conventional non-row sensitive crop harvesting headers are complex machines that have a substantial cutting width and are generally expensive to manufacture, often because of the drive mechanism for operating the various rotating components of the harvesting header. Smaller farming operations have a need for smaller forage harvester headers that can be manufactured at less cost, particularly if the drive mechanism can be simplified.

In U.S. Pat. No. 7,024,846, granted on Apr. 11, 2006, to Ulrich Bruening, the crop harvesting header is constructed with four rotary members that engage standing crop material to sever the standing crop material and convey the severed crop rearwardly into a chopping mechanism. The movement of the severed crop material is facilitated by the formation of chutes that capture ears of corn for delivery rearwardly to the chopping mechanism.

A non-row sensitive forage harvester header is disclosed in U.S. Pat. No. 6,032,444, granted to Mar. 7, 2000, to Maynard M. Herron, et al, wherein a pair of rotary disk cutters is disposed at the forward end of the header to engage standing row crop material. The disk cutters sever the standing crop which is trapped in the counter rotating rotors by endless gripping members that are entrained around the rotary disk cutters. The endless gripping members extend rearwardly from the corresponding disk cutters to trap the severed crop material between the opposing gripping members to convey the severed crop material rearwardly. The header is formed with upper and lower runs of gripping members with the upper runs being entrained around the upper portions of the rotary disk cutters to guide the severed crop trapped in the lower opposing runs of gripping members.

A non-row sensitive forage harvester header is taught in U.S. Pat. No. 5,722,225, issued to Richard Wuebbels, et al, on Mar. 3, 1998. The header is formed with multiple transversely spaced rotary disk cutters that are operable to sever standing row crop material, irrespective of the orientation of the row of crop material to the approaching disk cutters. The rotary disk cutters are operable to convey the severed crop material to a rearward portion of the header where multiple rotary transfer disks are positioned to convey the severed crop material toward the center of the header to be fed into the chopping mechanism. Similarly, the non-row sensitive forage harvester header disclosed in U.S. Pat. No. 5,237,804, issued on Aug. 24, 1993, to Alfred Bertling, et al, is formed with multiple transversely arrayed rotary disk cutters that convey crop material severed thereby rearwardly to a pair of rotary transfer drums that direct the severed crop material into the chopping mechanism.

A rotary cutting disk for forage harvester headers is disclosed in U.S. Pat. No. 5,651,243, granted on Jul. 29, 1997, to Rudolf Arnold, et al, in which the cutting disk is provided with a plurality of transporting prongs arranged around the circumference of the transporting disk. In U.S. Pat. No. 5,546,737, granted on Aug. 20, 1996, to Karl Moosbrucker, a mowing device for corn and other stalky crop is disclosed as consisting of a cutting disk and a separate transport disk rotatable about the same axis of rotation, with a complex drive mechanism that rotates the cutting disk in the opposite direction from the rotation of the transport disk.

Accordingly, it would be desirable to provide a forage harvester header that consists of a single rotary member having sufficient width for cover at least two rows of standing crop with a simplified drive mechanism that enables the harvester header to be manufactured economically and efficiently.

SUMMARY OF THE INVENTION

It is an object of this invention to overcome the disadvantages of the prior art by providing a forage harvester header consisting of a single rotary member having sufficient operating width to cover at least two rows of standing crop.

It is another object of this invention to provide a simplified drive mechanism to enable the single rotary member forage harvester header to be manufactured economically.

It is a feature of this invention that the forage harvester header consists of only a single rotary member.

It is an advantage of this invention that the drive mechanism for a single rotary member can be simplified.

It is another advantage of this invention that the simplified drive mechanism allows the single rotary member to be manufactured economically and efficiently.

It is another feature of this invention that the single rotary member sweeps severed crop material to one side of the rotary member for feeding into the forage harvester chopping mechanism.

It is still another feature of this invention that the drive mechanism has a vertical drive shaft having mounted thereon two drive sprockets for powering the rotation of the cutting member and the crop transfer disks.

It is still another advantage of this invention that the drive mechanism is capable of driving the rotation of the lowermost cutting disk at a different rate of rotational speed than the crop transfer disks are driven.

It is yet another feature of this invention that the crop transfer disks are driven from a first drive sprocket carried on the vertical drive shaft that engages a drive chain secured in a fixed location on the uppermost crop transfer disk.

It is still another feature of this invention that the lowermost cutting disk is driven with a chain drive mechanism that is operatively coupled to a second drive sprocket carried by the vertical drive shaft.

It is yet another advantage of this invention that the drive mechanism requires only a single gear box to redirect rotational power delivered by a horizontal drive shaft to the vertical drive shaft carrying the first and second drive sprockets for powering the crop transfer disks and the cutting disk.

It is still another object to form crop transfer disks in a manner to effectively transfer severed crop around the rotary member and into the chopping mechanism of the forage harvester.

It is another feature of this invention that the forage harvester header is formed with forwardly projecting crop guides on which rearwardly angled transfer arms are mounted to direct severed crop material radially inwardly with respect to the rotating crop transfer disks so that the severed crop will properly engage with the upper crop transfer disks.

It is yet another feature of this invention that the lowermost crop transfer disk is formed with sweeper members that engage crop material severed by the cutting disk located below the lowermost crop transfer disk and are operable to move the severed crop circumferentially for engagement with the angled transfer arms.

It is a yet another object of this invention to provide a single rotary member forage harvester header that is operatively effective, economical to manufacture, easy to maintain and simple and effective in use.

These and other objects, features and advantages will become know to one of ordinary skill in the art by providing a non-row sensitive forage harvester header formed with a single rotary member driven by a simplified drive mechanism that enables the header to be manufactured economically. The drive mechanism is coupled to the primary drive of the forage harvester to which the header is mounted, and transfers the rotational power horizontally laterally along the back of the header to a gear box. The vertical output shaft from the gearbox has a first drive sprocket mounted thereon to connect directly with a drive chain fixed to the uppermost crop transfer disk. A second drive sprocket is mounted on the vertical drive shaft and coupled to a drive chain entrained around a driven sprocket on the cutting disk to provide a drive speed differential with respect to the crop transfer disks. The crop guides are formed with rearwardly angled transfer arms that cooperate with the sweeper members on the lowermost crop transfer disk to direct the severed crop into engagement with the two upper crop transfer disks, whereupon the rotation of the transfer disks feed the crop into the forage harvester.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
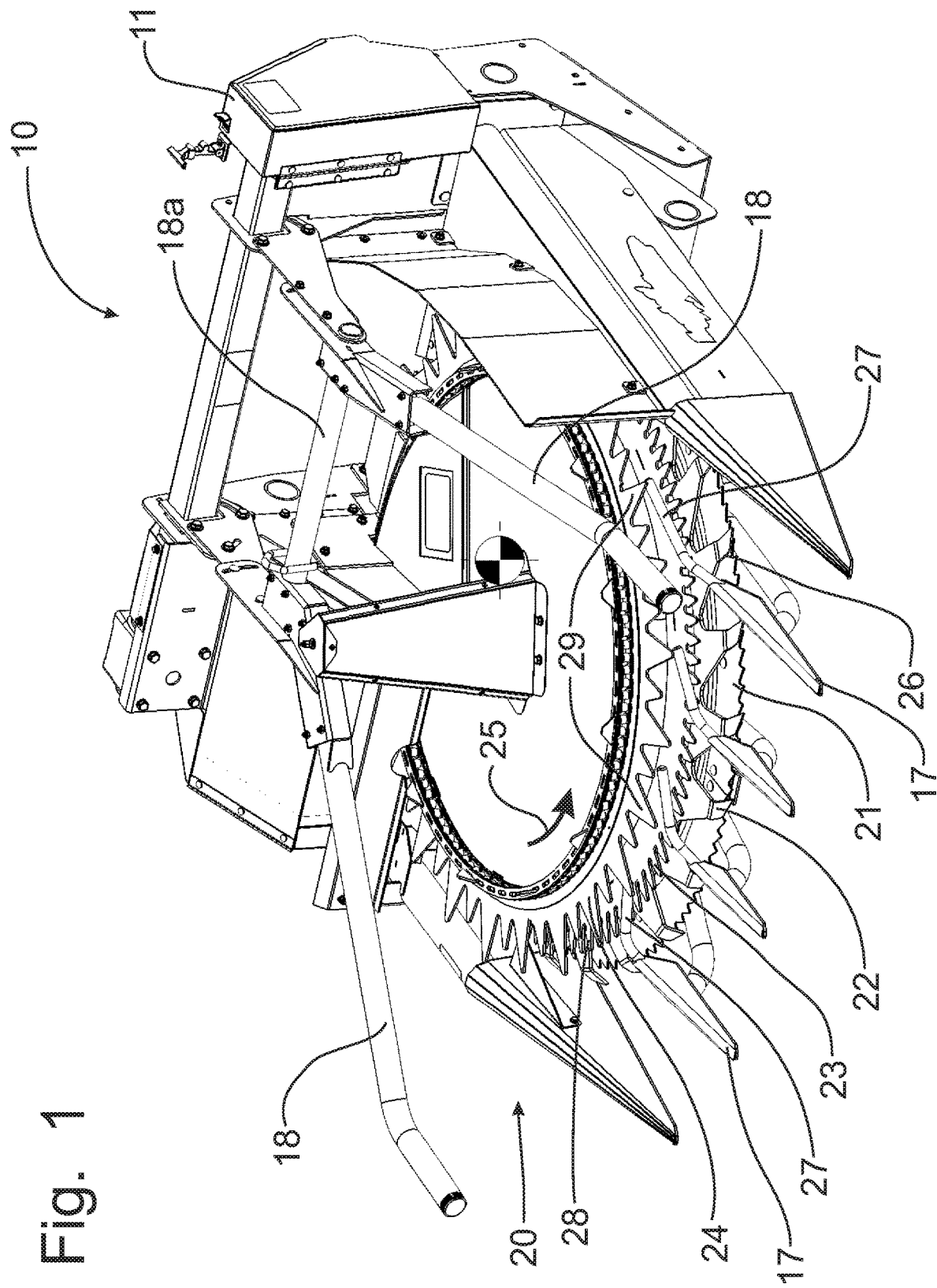
FIG. 1 is a left front perspective view of the single rotary member forage harvester header incorporating the principles of the instant invention, the header is shown as being detached from a forage harvester unit containing the chopping mechanism.
Figure 2:
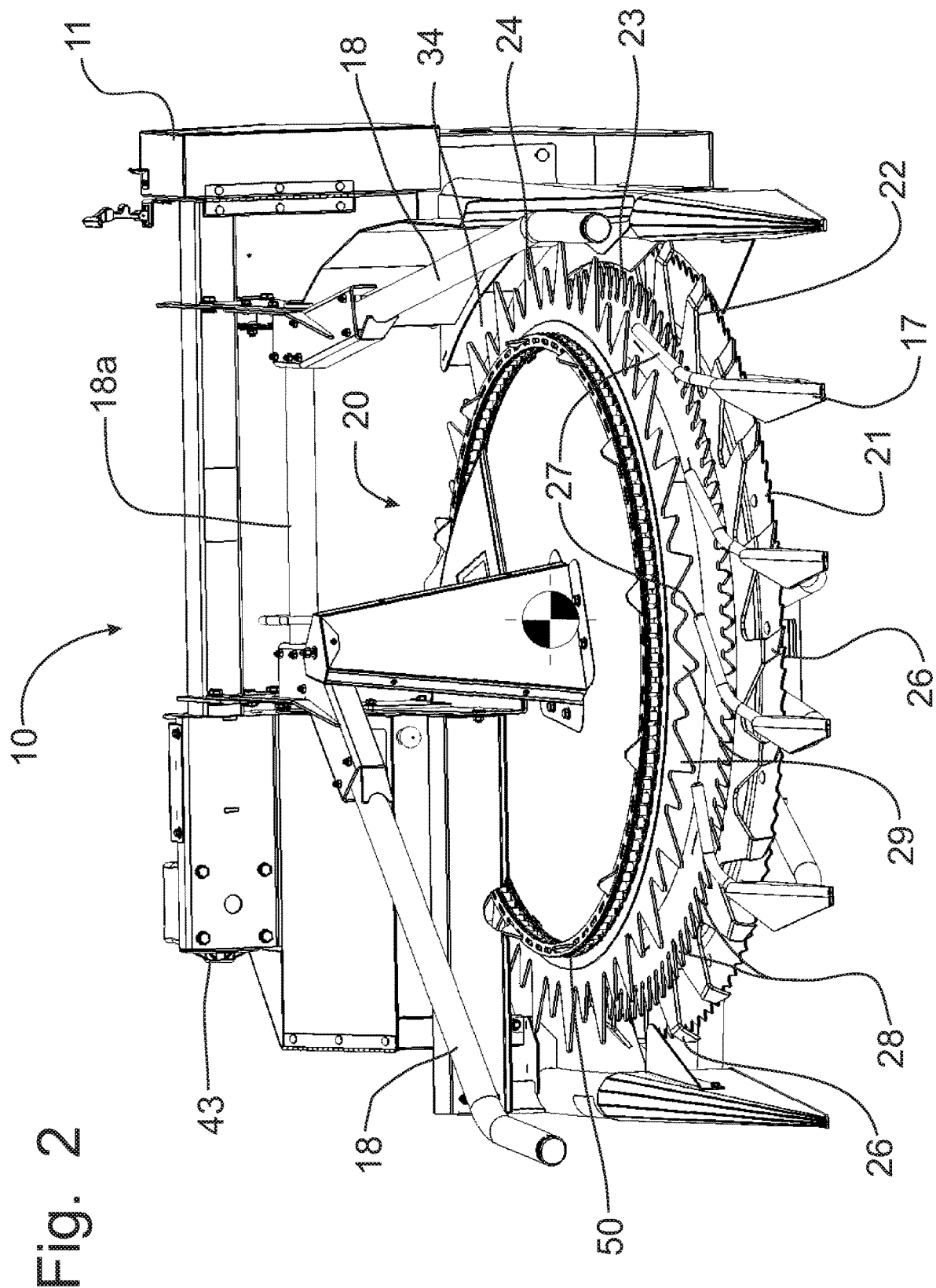
FIG. 2 is a front perspective view of the single rotary member forage harvester header depicted in FIG. 1.

Referring to the drawings a single rotary member forage harvester header incorporating the principles of the instant invention can best be seen. Any references to left or right are used as a matter of convenience and are determined by standing behind the forage harvester header and facing the uncut crop material, looking into the normal direction of travel for the operating forage harvester header. The single rotary member forage harvester header 10 has an operating width that is defined by the width of the single rotatable cutting member 20 supported on a frame 11 to engage the standing crop material and sever the standing crop material from the ground and convey the severed crop material rearwardly in a manner described in greater detail below.

The overall exterior views of the non-row sensitive forage harvester header 10 are shown in FIGS. 1-4. The header 10 is detachably mountable to a forage harvester base unit (not shown), which one of ordinary skill in the art will understand provides a source of rotational power and a chopping mechanism that is positioned to receive a flow of severed crop material from the header 10, as described in greater detail below. Typically, the forage harvester base unit (not shown) is a pull-type machine that is coupled to a prime mover, such as a tractor that provides motive, hydraulic and rotational power to the base unit, and ultimately to the header 10. The header 10 includes a frame 11 that has a base unit mounting member 12 at the rearward portions of the header 10 to permit a detachable connection of the header 10 to the forage harvester base unit (not shown).

The header 10 is formed with a single rotary disk cutting member 20 at the forward periphery of the header 10 to engage standing crop material and to sever the crop material from the ground for further subsequent processing treatment. The rotary disk cutting members 20 having multiple crop engaging members that operate to sever the crop and to convey the severed crop rearwardly, as will be described in greater detail below. The disk cutting member 20 is formed with a lower cutting disk 21 at a lower portion thereof and rotatably driven, as described in greater detail below, to sever standing crop material upon engagement therewith. Above the cutting disk 21 the rotary cutting member 20 has a plurality of transfer disks 22-24, whose function is to gather the severed crop material and transfer the severed crop material rearwardly for further harvesting treatment.

The lowermost of the transfer disks 22 has a plurality of circumferentially spaced sweeper members 26 that are bent downwardly to terminate immediately above the cutting disk 21. The sweeper members 26 work in conjunction with the angled transfer arms 27 to move the severed crop material radially inwardly into engagement with the two vertically spaced transfer disks 23, 24 where the severed crop material is wedged between prongs 28, 29 on the respective transfer disks 23, 24 to move the severed crop circumferentially in the direction indicated by arrow 25 around the periphery of the rotary cutting members 20.

The angled transfer arms 27 are mounted on forwardly projecting crop guides 17 and are positioned with respect to the rotary cutting members 20 to direct the severed crop material into engagement with the prongs 28, 29 on the transfer disks 23, 24. Elevated crop guides 18, 18a are supported on the frame 11 to help direct the movement of the severed crop material so that the severed butt end of the stalk of crop is oriented to feed rearwardly first into the cutterhead (not shown) before the rest of the severed stalk of crop.

Figure 3:
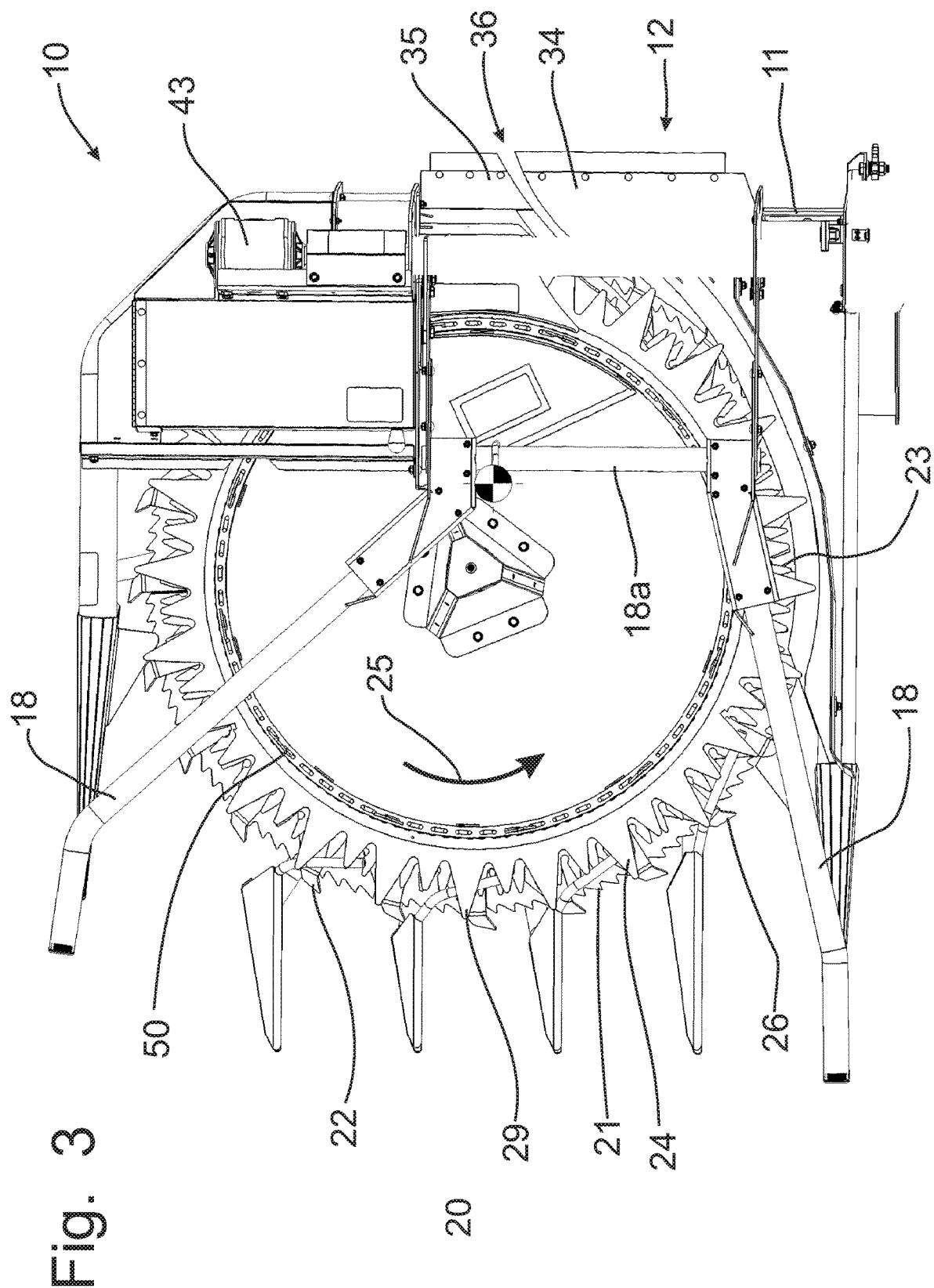
FIG. 3 is a top plan view of the single rotary member forage harvester header shown in FIG. 1.

The single rotary cutting member 20 is rotated in the direction indicated by the arrow 25 in FIGS. 1 and 3, which when viewed from the top is in a counter-clockwise direction to deliver the severed crop material around the circumferential periphery of the rotary member and ultimately rearwardly and inwardly between guides 34 and 35 for discharge from the forage harvester header 10 into the cutterhead (not shown). One skilled in the art will recognize that the configuration of forage harvester header 10 incorporating the principles of the instant invention does not require a separate transfer member or members to convey the severed crop into the cutterhead (not shown), as the rotation of the transfer disks 22-24 in conjunction with the placement of the first and second guides 34, 35, is sufficient to convey the severed crop into the cutterhead.

The first fixed guide plate 34 is supported on the frame 11 is positioned circumferentially with respect to the rotary cutting member 20 to cooperate therewith in guiding the severed crop rearwardly along the flow path defined between the guide plates 34, 35. The second fixed guide plate 35 is supported on the frame 11 adjacent to, but spaced from, the first fixed guide plate 34 to establish a flow channel that defines a discharge path from the header 10 into the cutterhead (not shown) that would be located on the base unit (not shown) immediately rearwardly of the first and second fixed guide plates 34, 35. With the transverse cross guide member 18a positioned above and forwardly of the rearward discharge of the header 10, the movement of row crops would be such that the cross guide member 18a knocks the tall crop into a substantially horizontal orientation as the severed butt end of the crop is guided along the flow path formed between the first and second fixed guide plates 34, 35.

Figure 4:
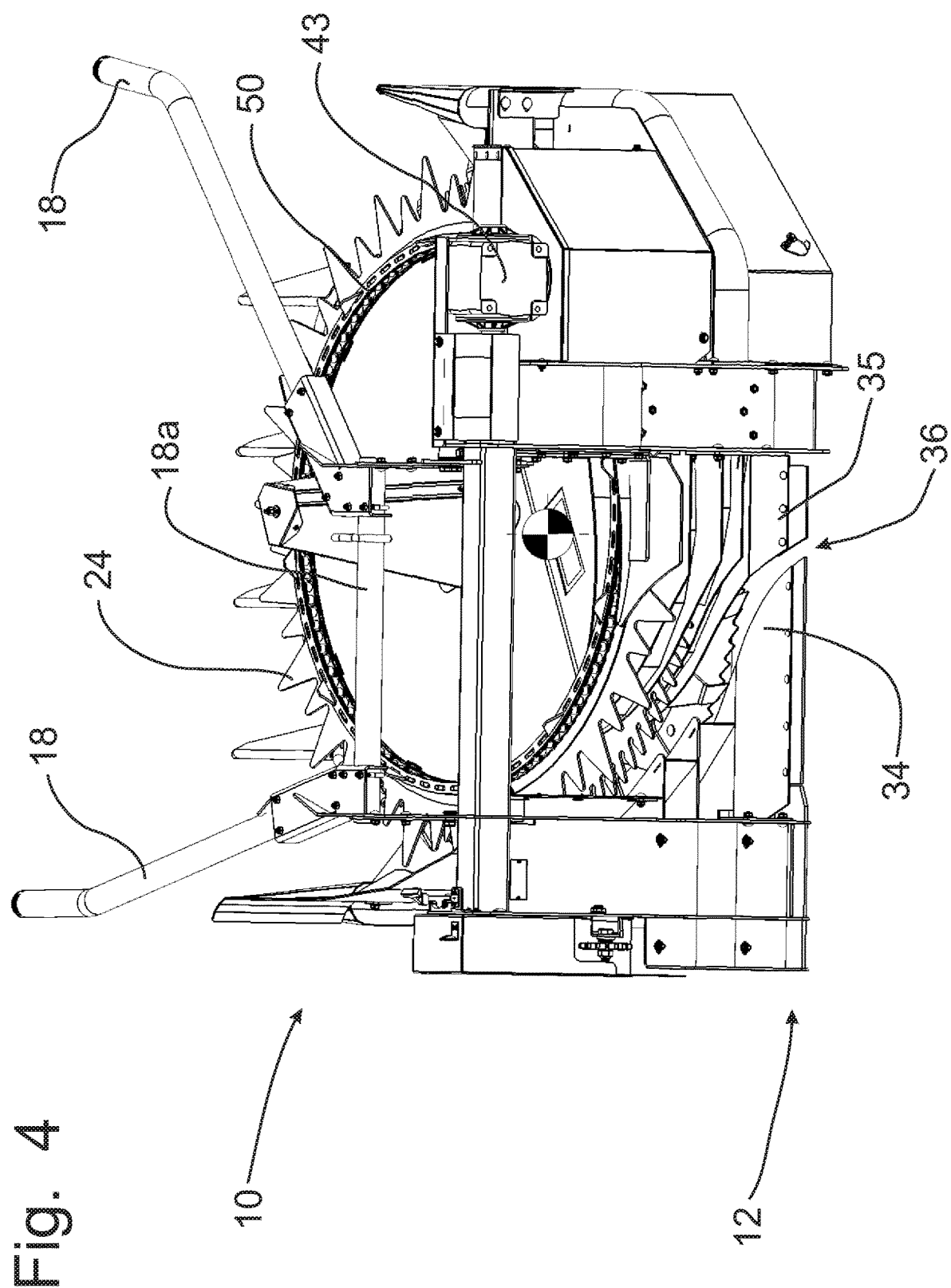
FIG. 4 is a rear elevational view of the single rotary member forage harvester header depicted in FIG. 1.

The first and second fixed guide plates 34, 35 are constructed as multi-layered weldments, as is best seen in FIG. 4. For example, the first fixed guide plate 34 has an upper component that cooperates with the uppermost transfer disk 24, a middle component that cooperates with the central transfer disk 23, and a larger floor component that cooperates with the lowermost transfer sick 22 to effectively guide the crop material along the flow path. To provide the flow path for the movement of the crop material, the second fixed crop guide 35 is constructed in substantially the same opposing manner with an upper component, a middle component and a floor component, as can be seen in FIG. 4. The floor component of the first fixed guide plate 34 is elevated slightly above the opposing floor component of the second fixed guide plate 35 to define a discharge slot 36 through which weeds and other accumulated non-crop material can pass to be discharged from the header 10 without being fed into the rearward cutterhead (not shown).

In operation, the non-row sensitive forage harvester header 10 is connected to a prime mover (not shown) to provide a source of rotational, hydraulic and motive power to the header 10 and the header 10 is driven into a field of standing row crop. The single rotating cutting member 20 engages and severs the lower portion of the standing crop from the ground by the cutting disk 21. The transfer disks 22-24 capture the severed crop and then guide the severed crop around the periphery of the cutting member 20 into engagement with the first and second guide plates 34, 35 for discharge rearwardly into the cutterhead (not shown). Accordingly, a single rotary cutter member 20 is operable to cut and convey crop material from the field into the cutterhead of the forage harvester to which the header 10 is attached.

Referring now to FIGS. 5-8, the drive mechanism 40 for the header 10 can best be seen. The primary drive input is along the left side of the header 10 and is preferably a chain drive that transfers rotational power from the base unit (not shown) to rotate an input drive sprocket 41 and a transverse drive shaft 42 on which the input drive sprocket 41 is mounted. Alternatively, the drive input could come through a belt drive mechanism or a hydraulic motor that is connected to the hydraulic system of the prime mover (not shown) to rotate the transverse drive shaft 42. In addition, alternative drive mechanisms could have a mechanical drive that includes a vertical drive shaft corresponding to the axis of rotation of the cutting member 20 and the transfer disks 22-24 in order to drive the cutting member 20 at a speed differential to the transfer disks 22-24.

Figure 5:
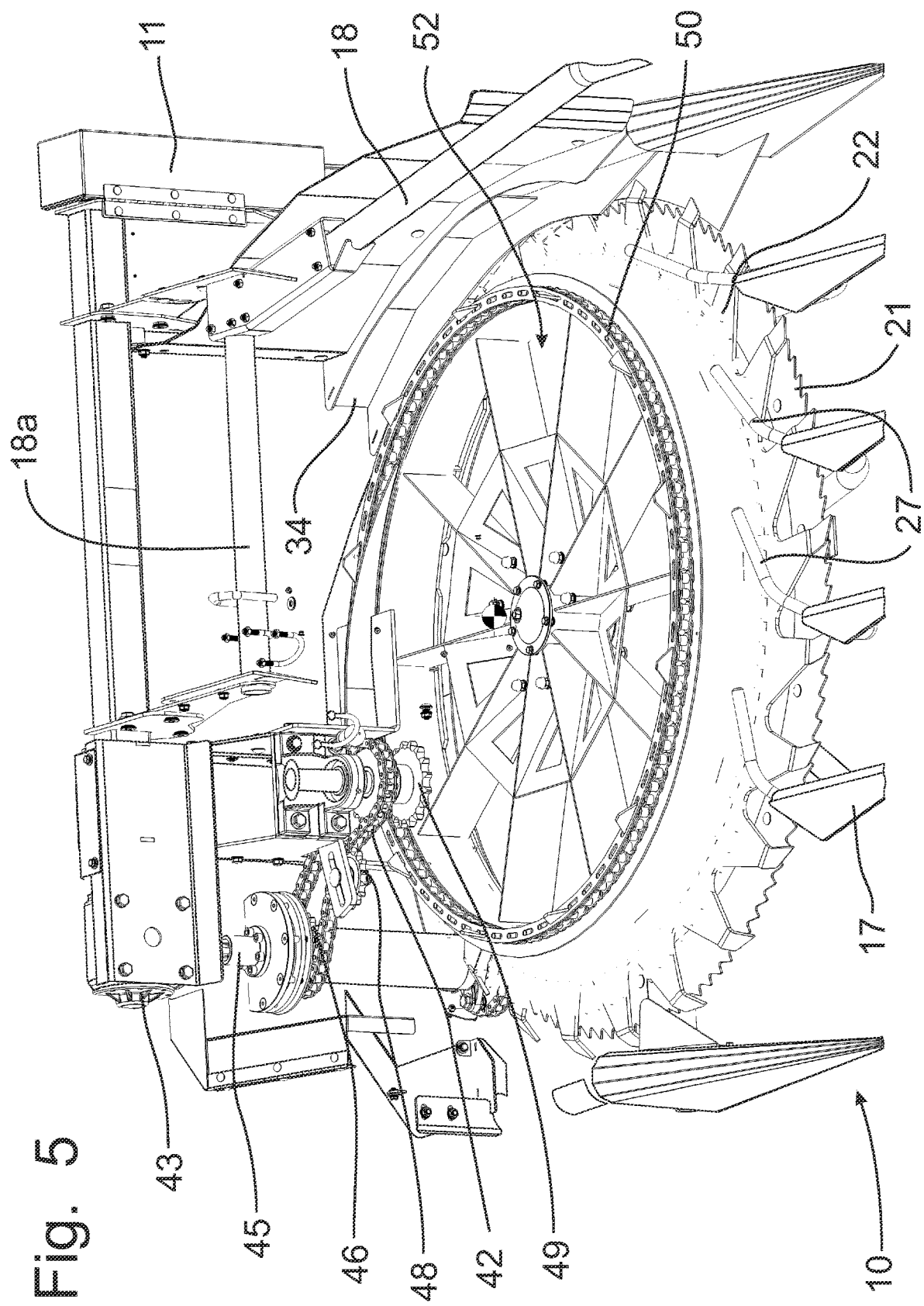
FIG. 5 is a front perspective view of the single rotary member forage harvester header with the top portion of the rotary member being broken away to permit a view of the supporting structure within the single rotary member.
Figure 7:
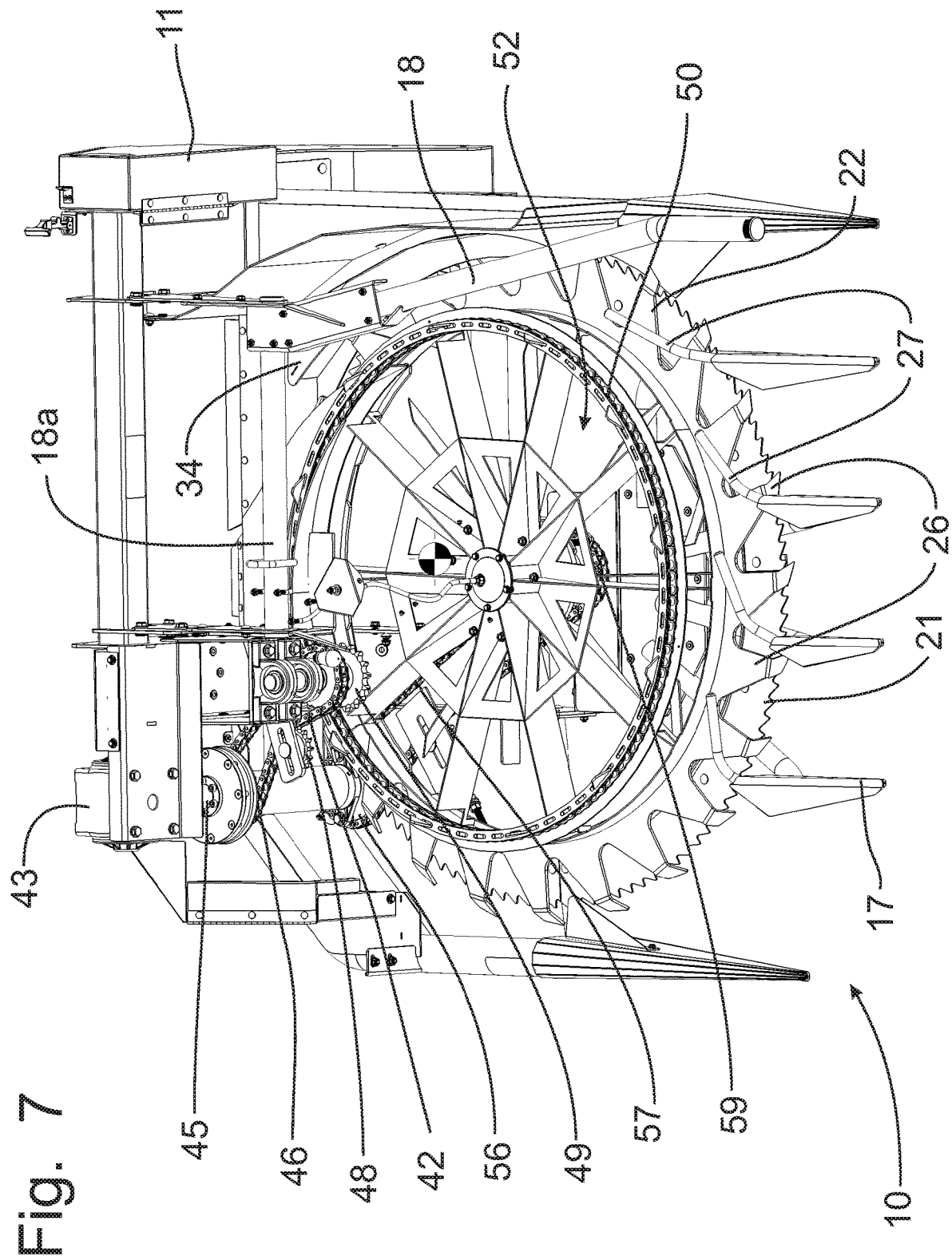
FIG. 7 is a front perspective view of the single rotary member forage harvester header but with several of the structural components of the rotary member being removed to permit viewing of the drive mechanism.
Figure 8:
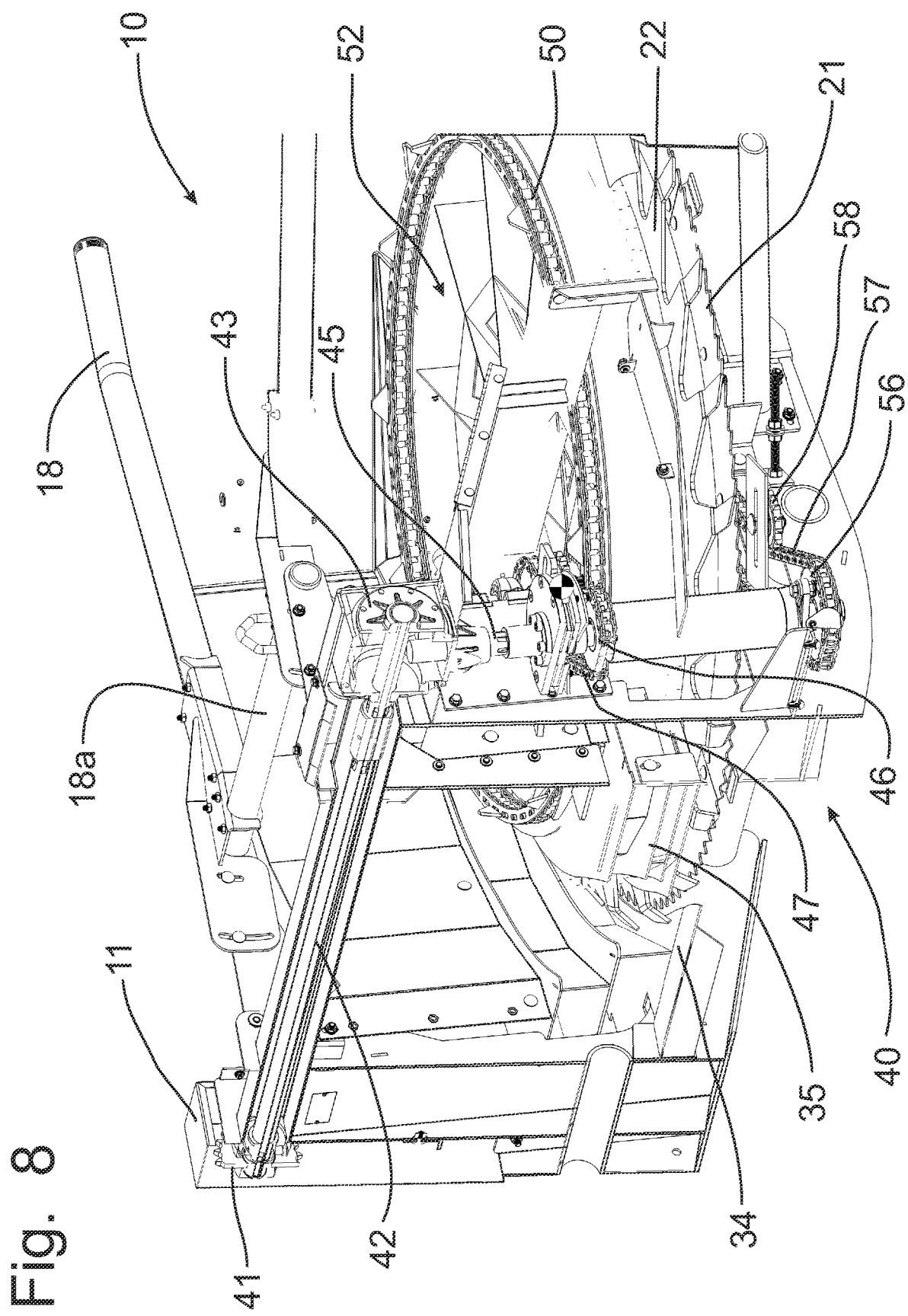
FIG. 8 is a cross-sectional rear perspective view to view the rearward portion of the drive mechanism.

The transverse drive shaft 42 is housed within the frame 11 of the header 10 and delivers rotational power to a first gear box 43 that transfers rotational power to a vertically oriented power transfer shaft 45. A first drive sprocket 46 is mounted on the vertical power transfer shaft 45 below the first gear box 43. As best seen in FIGS. 5, 7 and 8, a chain 47 is entrained around the first drive sprocket 46, a first idler sprocket 48 and a first driven sprocket 49. The first driven sprocket 49 is operatively engaged with a transfer disk drive chain 50 affixed to the top surface of the uppermost transfer disk 24. Thus, with the rotation of the first drive sprocket 46, the first driven sprocket 49 drives the rotation of the uppermost transfer disk 24. As best seen in FIGS. 5 and 7, the three transfer disks 22-24 are interconnected by an internal support structure 52 such that the rotation of the uppermost transfer disk 24 results in the simultaneous rotation of all three transfer disks 22-24 at the same rotational speed.

Figure 6:
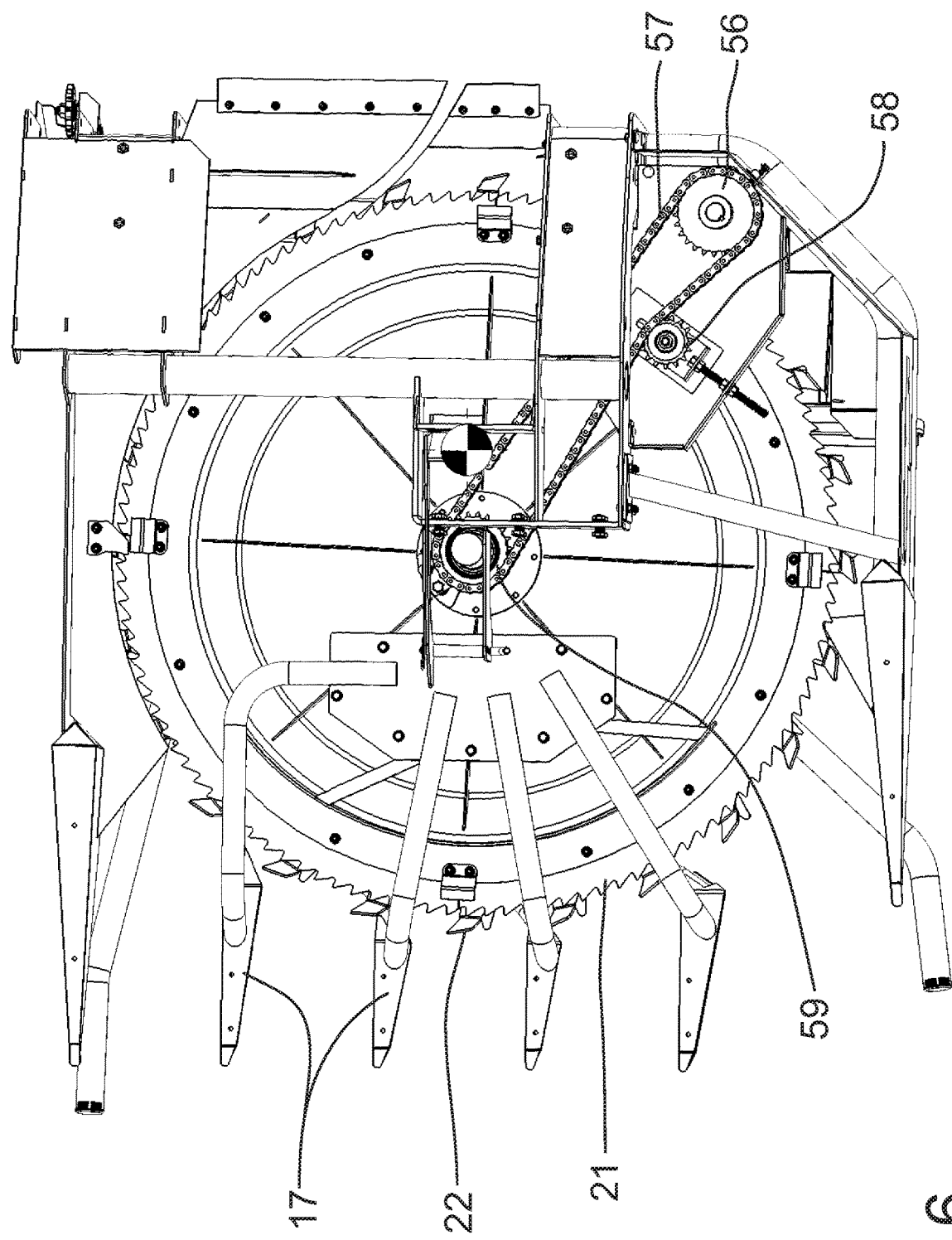
FIG. 6 is a bottom plan view of the single rotary member forage harvester header with the skid shoe and other structural components broken away to permit viewing of the lower portion of the drive mechanism rotating the cutting disk.

As best seen in FIGS. 5, 7 and 8, the vertically oriented power transfer shaft 45 extends below the first drive sprocket 46 and terminates at a second drive sprocket 56 having a cutter disk drive chain 57 entrained. As best seen in FIGS. 6 and 7, the cutter disk drive chain 47 also entrains around a second idler sprocket 58 and a second driven sprocket 59 mounted on the central axis of rotation at the bottom surface of the cutter disk 21. Therefore, the cutter disk 21 is powered separately from the three transfer disks 22-24, allowing the cutter disk 21 to be driven at a different rotational speed than the transfer disks 22-24, depending on the relative sizes of the first and second drive sprockets 46, 56.

Accordingly, the drive mechanism 40 for the single rotary cutter member forage harvester header 10 is comparatively simple, involving only chain drive devices and a single simple gear box 43 providing a change of direction of the drive input from horizontal to vertical. Multiple gear boxes are not required and the cutter disk 21 can be driven at a differential speed relative to the three transfer disks 22-24. The cutter disk 21 and the crop transfer disks 22-24 all rotate about a common axis of rotation with the cutter disk 21 being powered from below the cutter disk 21 and the transfer disks being powered from above the transfer disks 22-24.

It will be understood that changes in the details, materials, steps and arrangements of parts, which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A non-row sensitive forage harvester header, comprising:
 a frame;
 a single rotary cutting member rotatably driven to sever standing crop material from the ground and to convey the severed crop material rearwardly along a flow path, said single rotary cutting member including a cutting disk rotatable about an axis of rotation and operable to sever the standing crop material and a crop transfer assembly including at least two crop transfer disks rotatable about said axis of rotation to transfer the severed crop material around the periphery of said single rotary cutting member for discharge from said forage harvester header; and
 a drive apparatus supported on said frame and including a first drive mechanism operably connected to said at least two crop transfer disks to rotate said crop transfer disks about said axis of rotation together at a first rotational speed and a second drive mechanism operably connected to said cutting disk to rotate said cutting disk about said axis of rotation at a second rotational speed different from said first rotational speed of said crop transfer disks, said drive apparatus including a horizontally disposed drive shaft and a vertically oriented power transfer shaft interconnected with said horizontally disposed drive shaft by a gear box, said first drive mechanism being interconnected with an upper portion of said vertically oriented power transfer shaft and a fixed chain entrained around said crop transfer assembly for rotation of said crop transfer disks, and said second drive mechanism being interconnecting with a lower portion of said vertically oriented power transfer shaft and said cutting disk.

2. The non-row sensitive forage harvester header of claim 1 wherein said single rotary cutting member includes three interconnected crop transfer disks that are rotatably driven by said first drive mechanism so as to rotate at said first rotational speed, said first drive mechanism including a first drive sprocket assembly mounted on said vertically disposed power transfer shaft, a drive chain secured to an uppermost crop transfer disk in a fixed orientation, said drive chain being directly engaged with said first drive sprocket assembly to rotatably drive said uppermost crop transfer disk.

3. The non-row sensitive forage harvester header of claim 2 wherein said second rotational speed of said cutting disk is greater than said first speed of rotation of said crop transfer disks.

4. The non-row sensitive forage harvester header of claim 2 wherein said second drive mechanism including a second drive sprocket mounted on said vertically oriented power transfer shaft below said first drive sprocket assembly.

5. The non-row sensitive forage harvester header of claim 4 wherein said second drive mechanism further includes a driven sprocket affixed to said cutting disk and a flexible drive transfer member entrained around said second drive sprocket and said driven sprocket, said second drive mechanism being positioned beneath said cutting disk.

6. The non-row sensitive forage harvester header of claim 5 wherein said flexible drive transfer member is a drive chain.

7. The non-row sensitive forage harvester of claim 6 wherein said three crop transfer disks are structurally interconnected to permit said drive chain to power the rotation of all three crop transfer disks simultaneously.

8. The non-row sensitive forage harvester header of claim 2 wherein said frame supports a first guide member located outboard of said transfer disks and configured to parallel a circumferential edge of said transfer disks, said frame also supporting a second guide member spaced inboard of said first guide member to define said flow path therebetween for the conveyance of said severed crop material.

9. The non-row sensitive forage harvester header of claim 2 further comprises a plurality of forwardly extending guide members, each said guide member including a rearwardly extending transfer arm angularly bent in a direction corresponding to the direction of rotation of said single rotary member, said transfer arms directing severed crop material inwardly into engagement with said crop transfer disks.

10. A non-row sensitive forage harvester header, comprising:
 a frame;
 a single rotary cutting member rotatably driven to sever standing crop material from the ground and to convey the severed crop material rearwardly around the periphery of the single rotary cutting member, said single rotary cutting member including a cutting disk rotatable about an axis of rotation and operable to sever the standing crop material and a crop transfer disk assembly also rotatable about said axis of rotation to transfer the severed crop material along a flow path around the periphery of said single rotary cutting member for discharge from said forage harvester header; and
 a drive apparatus supported on said frame and having a vertically oriented power transfer shaft, said drive apparatus including a first drive mechanism operably interconnecting an upper portion of said vertically oriented power transfer shaft and a fixed chain entrained in a circular fashion around said crop transfer disk assembly to rotate said crop transfer disk assembly about said axis of rotation at a first rotational speed and a second drive mechanism operably interconnecting a lower portion of said vertically oriented power transfer shaft and said cutting disk to rotate said cutting disk about said axis of rotation at a second rotational speed different from said first rotational speed.

11. The non-row sensitive forage harvester header of claim 10 further comprising a plurality of forwardly extending guide members, each said guide member including a rearwardly extending transfer arm angularly bent in a direction corresponding to the direction of rotation of said single rotary member, said transfer arms directing severed crop material inwardly into engagement with said crop transfer disk assembly.

12. The non-row sensitive forage harvester header of claim 11 wherein said crop transfer disk assembly is formed of three crop transfer disks, including a lowermost crop transfer disk, a central crop transfer disk and an uppermost crop transfer disk, said lowermost crop transfer disk having sweeping members that engage severed crop material and direct the severed crop material around the periphery of the single rotary cutting member into engagement with said transfer arms to direct said severed crop material into engagement with the central and uppermost transfer disks, said three crop transfer disks being interconnected so as to rotate together at a common first rotational speed.

13. The non-row sensitive forage harvester header of claim 12 wherein said drive apparatus includes a vertically oriented power transfer shaft having first and second drive sprockets mounted on said vertically oriented power transfer shaft, said first drive sprocket being a part of said first drive mechanism and said second drive sprocket being a part of said second drive mechanism.

14. The non-row sensitive forage harvester header of claim 13 wherein said first drive mechanism further includes a first drive chain secured to an uppermost crop transfer disk in a fixed orientation, said drive chain being directly engaged with said first drive sprocket to rotatably drive said uppermost crop transfer disk, said second drive mechanism further including a driven sprocket affixed to said cutting disk and a second drive chain entrained around said second drive sprocket and said driven sprocket to rotatably drive said cutting disk.

15. A non-row sensitive forage harvester header, comprising:
 a frame;
 a single rotary cutting member rotatably driven to sever standing crop material from the ground and to convey the severed crop material rearwardly around the periphery of the single rotary cutting member, said single rotary cutting member including a cutting disk rotatable about an axis of rotation and operable to sever the standing crop material and a crop transfer disk assembly also rotatable about said axis of rotation to transfer the severed crop material along a flow path around the periphery of said single rotary cutting member for discharge from said forage harvester header; and
 a drive apparatus supported on said frame and including:
  a vertically oriented power transfer shaft positioned rearwardly of said single rotary cutting member;
  a first drive mechanism having a first drive sprocket mounted on an upper portion of said power transfer shaft and a driven sprocket, said first drive mechanism being operably connected to said crop transfer disk assembly to power the rotation thereof, said first drive mechanism including a fixed drive chain entrained around said crop transfer disk assembly in a circular configuration, said fixed drive chain being engaged by said driven sprocket to affect rotation of said crop transfer disk assembly in response to rotation of said first drive sprocket; and
  a second drive mechanism having a second drive sprocket mounted on a lower portion of said power transfer shaft and operably connected to a driven sprocket secured to said cutting disk to power the rotation thereof by a flexible drive chain entrained around both said second drive sprocket and said driven sprocket to affect rotation of said cutting disk in response to rotation of said second drive sprocket.

16. The non-row sensitive forage harvester header of claim 15 further comprises a plurality of forwardly extending guide members, each said guide member including a rearwardly extending transfer arm angularly bent in a direction corresponding to the direction of rotation of said single rotary member, said transfer arms directing severed crop material inwardly into engagement with said crop transfer disk assembly.

* * * * *